United States Patent
Chen et al.

(10) Patent No.: US 11,176,685 B2
(45) Date of Patent: Nov. 16, 2021

(54) IMAGE COLLECTION CONTROL METHOD AND DEVICE, AND VEHICLE CHASSIS IMAGE OBTAINING SYSTEM

(71) Applicant: Hangzhou Hikrobot Technology Co., Ltd, Zhejiang (CN)

(72) Inventors: Yuanji Chen, Zhejiang (CN); Pinjiang He, Zhejiang (CN); Wencong Zhang, Zhejiang (CN)

(73) Assignee: HANGZHOU HIKROBOT TECHNOLOGY CO., LTD, Zhejiang (CN)

( * ) Notice: Subject to any disclaimer, the term of this patent is extended or adjusted under 35 U.S.C. 154(b) by 0 days.

(21) Appl. No.: 16/611,726

(22) PCT Filed: Apr. 26, 2018

(86) PCT No.: PCT/CN2018/084649
§ 371 (c)(1),
(2) Date: Nov. 7, 2019

(87) PCT Pub. No.: WO2018/205843
PCT Pub. Date: Nov. 15, 2018

(65) Prior Publication Data
US 2020/0105002 A1    Apr. 2, 2020

(30) Foreign Application Priority Data

May 9, 2017   (CN) .......................... 201710323498.9
May 9, 2017   (CN) .......................... 201710324300.9
May 9, 2017   (CN) .......................... 201720510153.X

(51) Int. Cl.
*G06T 7/246*   (2017.01)
*G06T 7/80*    (2017.01)
(Continued)

(52) U.S. Cl.
CPC ................ *G06T 7/246* (2017.01); *G06T 7/73* (2017.01); *G06T 7/80* (2017.01); *H04N 5/2252* (2013.01);
(Continued)

(58) Field of Classification Search
None
See application file for complete search history.

(56) References Cited

U.S. PATENT DOCUMENTS

| | | | |
|---|---|---|---|
| 2008/0211914 A1 | 9/2008 | Herra et al. | |
| 2010/0238290 A1* | 9/2010 | Riley | H04N 7/18 348/148 |
| 2011/0229013 A1* | 9/2011 | Huang | H04N 13/246 382/154 |

FOREIGN PATENT DOCUMENTS

| | | | |
|---|---|---|---|
| CN | 102167059 A | | 8/2011 |
| CN | 103197090 A | * | 7/2013 |
| CN | 103197090 A | | 7/2013 |
| CN | 103439752 A | | 12/2013 |

(Continued)

OTHER PUBLICATIONS

Ibrahim et al. ( Speed Detection Camera System using Image Processing Techniques on Video Streams, 2011, hereinafter Ibrahim) (Year: 2011).*

(Continued)

*Primary Examiner* — Samuel D Fereja
(74) *Attorney, Agent, or Firm* — Meunier Carlin & Curfman LLC

(57) ABSTRACT

Embodiments of a method and device for controlling image capturing and a system for acquiring an image of a chassis of a vehicle are provided, which relate to image capturing technology and can eliminate deformation of images occurred due to stretch or compression in image capturing. The system includes a speed measuring module, a control module, and a line scan camera. The speed measuring module measures the speed of the vehicle and transmits the (Continued)

measured speed of the vehicle to the control module. The control module determines line frequency for image capturing according to the speed of the vehicle, and controls the line scan camera to perform image capturing on the chassis of the vehicle with the line frequency.

17 Claims, 6 Drawing Sheets

(51) Int. Cl.
*G06T 7/73* (2017.01)
*H04N 5/225* (2006.01)
*H04N 5/235* (2006.01)

(52) U.S. Cl.
CPC . *H04N 5/2354* (2013.01); *G06T 2207/30252* (2013.01)

(56) References Cited

FOREIGN PATENT DOCUMENTS

| | | |
|---|---|---|
| CN | 203537492 U | 4/2014 |
| CN | 105426922 A | 3/2016 |
| CN | 105989593 A | 10/2016 |
| CN | 207022102 U | 2/2018 |
| JP | 2001126184 A | 5/2001 |

OTHER PUBLICATIONS

International Search Report and Written Opinion from corresponding International Application No. PCT/CN2018/074649, dated Jul. 13, 2018, 6 pages.

Extended European Search Report issued in corresponding European Application No. 18799036.1, dated Mar. 24, 2020, 8 pages.

Osman, Ibrahim et al., Speed Detection Camera System Using Image Processing Techniques on Video Systems, International Journal of Electrical and Computer Engineering, Jan. 1, 2011, pp. 771-778.

* cited by examiner

IMAGE COLLECTION CONTROL METHOD AND DEVICE, AND VEHICLE CHASSIS IMAGE OBTAINING SYSTEM

The present application claims priority to PCT International Application No. PCT/CN2018/084649, filed Apr. 26, 2018, which claims priority to Chinese patent application No. 201710323498.9 filed with the China National Intellectual Property Administration (CNIPA) on May 9, 2017 and entitled "Image Acquisition Control Method, Control Device and Image Acquisition System", Chinese patent application No. 201710324300.9 filed with the CNIPA on May 9, 2017 and entitled "System for acquiring an image of a chassis of a vehicle and Image Acquisition Control Method", and Chinese patent application No. 201720510153.X filed with the CNIPA on May 9, 2017 and entitled "System for acquiring an image of a chassis of a vehicle", which are each incorporated herein by reference in their entireties.

TECHNICAL FIELD

The present application relates to image capturing technology, and in particular, to a method and device for controlling image capturing and a system for acquiring an image of a chassis of a vehicle.

BACKGROUND

A line scan camera is a camera employing a line scan image sensor. The sensor of the line scan camera has one or more rows of photosensitive elements. The line scan camera records image data by scanning one line at a time, and has high scanning frequency and high resolution. Generally, an object moves perpendicular to the line scan direction of the image sensor in the line scan camera, and one or more line scan cameras continuously scan the object line by line.

The inventors have recognized that existing line scan cameras have disadvantages in capturing an image. For example, an object to be measured passes through the detection area of the line scan camera at a non-uniform speed, while the line scan camera always captures images of the object with a fixed line frequency. This causes the images captured by the line scan camera being stretched or compressed and thereby deformed, which severely affects the utility of the images.

SUMMARY

An objective of the embodiments of the present application is to provide a method and device for controlling image capturing and a system for acquiring an image of a chassis of a vehicle, to eliminate the deformation of an image captured by a line scan camera due to being stretched or compressed.

In order to achieve the above objective, an embodiment of the present application provides a method for controlling image capturing, including:

measuring a speed of an object;
determining line frequency for image capturing according to the speed of the object; and
controlling a line scan camera to perform image capturing on the object with the line frequency.

Optionally, the step of measuring the speed of the object includes:

capturing, by an image capturing module, images of the object in motion continuously, and
calculating the number of pixels $V_P$ that the object travels across per unit time on an imaging plane of the image capturing module by using the continuously captured images;

and wherein the step of determining the line frequency for image capturing according to the speed of the object includes:

determining the line frequency for image capturing according to the calculated number of pixels $V_P$.

Optionally, the step of calculating the number of pixels $V_P$ that the object travels across per unit time on the imaging plane of the image capturing module includes:

determining relative positions of a feature point of the object both in the i-th image and in the (i+1)-th image captured by the image capturing module, wherein i is an integer and $1 \leq i < m$, and m is the total number of the images captured by the image capturing module;

determining the number of pixels n between the determined two relative positions; and calculating the number of pixels $V_p$ that the object travels across per unit time on the imaging plane of the image capturing module according to the following formula:

$$V_P = n/t;$$

wherein t is a time interval between the capturing of the i-th image and the capturing of the (i+1)-th image by the image capturing module.

Optionally, the step of determining the line frequency for image capturing according to the calculated number of pixels $V_P$ includes:

determining the line frequency for image capturing Q according to the following formula when a linking line linking the image capturing module and the line scan camera is parallel to a direction of motion of the object:

$$Q = V_P * (p_2/f_2) * (f_1/p_1);$$

wherein, $V_p$ is the number of pixels that the object travels across per unit time on the imaging plane of the image capturing module; $p_2$ is a size of a single pixel of the image capturing module; $f_2$ is a focal length of the image capturing module; $p_1$ is a size of a single pixel of the line scan camera; and $f_1$ is a focal length of the line scan camera.

Optionally, the direction of motion of the object is a direction from the image capturing module towards the line scan camera.

Optionally, the step of determining line frequency for image capturing according to the speed of the object includes:

determining the line frequency for image capturing according to the speed of the object, the number of pixels per one row of the line scan camera and a preset scale factor.

Optionally, the step of determining the line frequency for image capturing according to the speed of the object, the number of pixels per one row of the line scan camera and the preset scale factor includes:

calculating the line frequency for image capturing Q according to the following formula:

$$Q = k * w * v;$$

wherein v is the speed of the object; w is the number of pixels per one row of the line scan camera; and k is the preset scale factor.

Optionally, the measuring of the speed of the object includes: detecting a change in the speed of the object; and in response to that a change in the speed of the object is detected, determining the changed speed;

wherein the determining of the line frequency for image capturing according to the speed of the object includes: determining new line frequency for image capturing according to the changed speed;

and wherein the controlling of the line scan camera to perform image capturing on the object with the line frequency includes: continuing the image capturing on the object with the newly determined line frequency.

Optionally, the method further includes:

providing fill-in light for the object while the line scan camera is controlled to perform image capturing on the object.

Optionally, before measuring the speed of the object, the method further includes:

detecting incoming of the object; and in response to that the incoming of the object is detected, generating an incoming signal to trigger the measurement of the speed of the object.

Optionally, the method further includes:
detecting leaving of the object; and
in response to that the leaving of the object is detected, generating an outgoing signal to control the line scan camera to stop the image capturing on the object.

Optionally, wherein the object is a vehicle; and
wherein the step of controlling the line scan camera to perform image capturing on the object with the line frequency includes:

controlling the line scan camera to perform image capturing on a chassis of the vehicle with the line frequency.

In order to achieve the above objective, an embodiment of the present application further provides a device for controlling image capturing, including:

a speed measuring unit, configured to measure a speed of an object;

a determining unit, configured to determine line frequency for image capturing according to the speed of the object; and a control unit, configured to control a line scan camera to perform image capturing on the object with the line frequency.

Optionally, the speed measuring unit is further configured to capture images of the object in motion continuously by using an image capturing module, and to calculate the number of pixels $V_P$ that the object travels across per unit time on an imaging plane of the image capturing module by using the continuously captured images; and wherein the determining unit is further configured to determine the line frequency for image capturing according to the calculated number of pixels $V_P$.

Optionally, the speed measuring unit is further configured to:

determine relative positions of a feature point of the object both in the i-th image and in the (i+1)-th image captured by the image capturing module, wherein i is an integer and $1 \leq i < m$, and m is the total number of the images captured by the image capturing module;

determine the number of pixels n between the determined two relative positions; and determine the number of pixels $V_p$ that the object travels across per unit time on the imaging plane of the image capturing module according to the following formula:

$$V_p = n/t;$$

wherein t is a time interval between the capturing of the i-th image and the capturing of the (i+1)-th image by the image capturing module.

Optionally, the determining unit is further configured to:
determine the line frequency for image capturing Q according to the following formula when a linking line linking the image capturing module and the line scan camera is parallel to a direction of motion of the object:

$$Q = V_p * (p_2/f_2) * (f_1/p_1);$$

wherein, $V_p$ is the number of pixels that the object travels across per unit time on the imaging plane of the image capturing module; $p_2$ is a size of a single pixel of the image capturing module; $f_2$ is a focal length of the image capturing module; $p_1$ is a size of a single pixel of the line scan camera; and $f_1$ is the focal length of the line scan camera.

Optionally, the direction of motion of the object is a direction from the image capturing module towards the line scan camera.

Optionally, the determining unit is further configured to:
determine the line frequency for image capturing according to the speed of the object, the number of pixels per one row of the line scan camera and a preset scale factor.

Optionally, the determining unit is further configured to:
calculate the line frequency for image capturing Q according to the following formula:

$$Q = k*w*v;$$

wherein v is the speed of the object; w is the number of pixels per one row of the line scan camera; and k is the preset scale factor.

Optionally, the speed measuring unit is further configured to: detect a change in the speed of the object, and in response to that a change in the speed of the object is detected, determine the changed speed;

the determining unit is further configured to: determine new line frequency for image capturing according to the changed speed; and the control unit is further configured to: continue the image capturing on the object with the newly determined line frequency.

Optionally, the device further includes: a light filling unit, configured to provide supplementary light on the object while the line scan camera is controlled to perform image capturing on the object.

Optionally, the device further includes: a first detecting unit, configured to detect incoming of the object, generate an incoming signal in response to that the incoming of the object is detected, and transmit the incoming signal to the speed measuring unit to trigger the speed measuring unit to measure the speed of the object.

Optionally, the device further includes: a second detecting unit, configured to detect leaving of the object; generate an outgoing signal in response to that the leaving of the object is detected, to trigger the control unit to control the line scan camera to stop the image capturing on the object.

Optionally, the object is a vehicle; and
wherein the control unit is further configured to control the line scan camera to perform image capturing on a chassis of the vehicle with the line frequency.

In order to achieve the above objective, an embodiment of the present application further provides a system for acquiring an image of a chassis of a vehicle, including a speed measuring module, a control module and a line scan camera; wherein the speed measuring module and the line scan camera are electrically connected to the control module, respectively;

the speed measuring module is configured to measure a speed of the vehicle and transmit the measured speed of the vehicle to the control module; and the control module is configured to determine line frequency for image capturing according to the speed of the vehicle, and control the line scan camera to perform image capturing on the chassis of the vehicle with the line frequency.

Optionally, the control module is further configured to:

determine the line frequency for image capturing according to the speed of the vehicle, the number of pixels per one row of the line scan camera and a preset scale factor.

Optionally, the control module is further configured to calculate the line frequency for image capturing Q according to the following formula:

$$Q=k*w*v;$$

wherein v is the speed of the vehicle; w is the number of pixels per one row of the line scan camera; and k is the preset scale factor.

Optionally, the speed measuring module is further configured to detect a change in the speed of the vehicle; and in response to that a change in the speed of the vehicle is detected, determine the changed speed;

wherein the control module is further configured to determine new line frequency for image capturing according to the changed speed;

and wherein the line scan camera is further configured to continue the image capturing on the chassis of the vehicle with the newly determined line frequency.

Optionally, the device further includes: a light filling module configured to provide fill-in light for the chassis of the vehicle under the control of the control module.

Optionally, the light filling module is arranged on a side of the line scan camera and located on a line scan direction of the line scan camera.

Optionally, the device further includes:

a first detecting module, arranged on a side of the speed measuring module near where the vehicle enters, which is configured to detect incoming of the vehicle, generate an incoming vehicle signal in response to that the incoming of the vehicle is detected, and transmit the incoming vehicle signal to the speed measuring module to trigger the speed measuring module to measure the speed of the vehicle.

Optionally, the device further includes:

a second detecting module, arranged on a side of the line scan camera near where the vehicle leaves, which is configured to detect leaving of the vehicle, generate an outgoing signal in response to that the leaving of the vehicle is detected, and transmit the outgoing signal to the control module to trigger the control module to control the line scan camera to stop the image capturing on the chassis of the vehicle.

Optionally, the device further includes:

a metal protection cylinder;

wherein the line scan camera is arranged in the metal protection cylinder; and wherein a transparent cover for a lens of the line scan camera is arranged on the metal protection cylinder, a damage-proof protection member is arranged over the transparent cover, and a light incident hole is formed on the damage-proof protection member.

Optionally, the metal protection cylinder includes an outer cylinder and an inner cylinder sleeved in the outer cylinder, wherein the line scan camera is arranged inside the inner cylinder;

the transparent cover is supported over the inner cylinder, and the damage-proof protection member is supported over the outer cylinder.

In order to achieve the above objective, an embodiment of the present application further provides an electronic device, including a processor and a machine-readable storage medium. The machine-readable storage medium stores thereon machine executable instructions which, when executed by the processor, cause the processor to carry out the method for controlling image capturing.

In order to achieve the above objective, an embodiment of the present application further provides a machine-readable storage medium having stored thereon instructions which, when called and executed by a processor, cause the processor to carry out the method for controlling image capturing.

In order to achieve the above objective, an embodiment of the present application further provides a computer program which, when executed by a processor, implement the method for controlling image capturing.

The embodiments of the present application provide a method and device for controlling image capturing and a system for acquiring an image of a chassis of a vehicle. The speed of the object is measured, the line frequency for image capturing is determined according to the speed of the object, and image capturing of the object is performed with the determined line frequency. The line frequency of the line scan camera can thus match the speed of the object, which can effectively eliminate deformation of images of the object captured by a line scan camera, which would otherwise occur due to stretch or compression, and thereby improve the utility of these images.

BRIEF DESCRIPTION OF THE DRAWINGS

In order to make the technical solutions in the embodiments of the present application or the related art more clear, drawings to be used in the embodiments or the related art description are briefly described below. Obviously, the drawings described below are only for some embodiments of the application, other drawings can also be obtained from the drawings described herein by those of ordinary skills in the art without any creative efforts.

DETAILED DESCRIPTION

The embodiments of the present application will be described in details below with reference to the accompanying drawings.

Apparently, the described embodiments are only some embodiments of the present application, and not all of them. Any other embodiments obtained by a person of ordinary skills in the art based on the embodiments herein without any creative efforts fall within the protection scope of the present application.

Currently, line frequency is the number of rows of pixels captured by a line scan camera per unit time, which is measured in Hz. A line scan camera captures an image of an object by scanning the object. When the object to be measured passes through the image capturing area of the line scan camera, the speed of the object to be measured is required to match the line frequency of the line scan camera. A higher speed of the object to be measured could lead to insufficient sampling of the line scan camera and thus a compressed image. On the other hand, a lower speed of the object to be measured could result in a stretched image.

In order to address the problem that an image of the chassis of a vehicle captured by a line scan camera is stretched or compressed, embodiments of a method and device for controlling image capturing and of a system for acquiring an image of a chassis of a vehicle are provided herein.

An embodiment of the method for controlling image capturing provided by the present application includes: measuring the speed of an object; determining line frequency for image capturing according to the speed of the object; and controlling a line scan camera to capture an image of the object with the determined line frequency. The embodiment of the present application can enable the line scan camera to eliminate deformation that could occur on an image of the object captured by the line scan camera due to stretching or compression, and thereby improve utility of the image captured by the line scan camera. The object may be, for example, a vehicle or a person.

Embodiments of the present application will be described below by way of example.

First Embodiment

Figure 1:
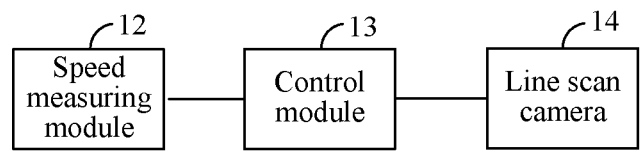
FIG. 1 is a schematic structural diagram of a system for acquiring an image of a chassis of a vehicle provided by a first embodiment of the present application.

FIG. 1 is a schematic structural diagram of a system for acquiring an image of a chassis of a vehicle provided by the first embodiment of the present application. Referring to FIG. 1, the embodiment of the system for acquiring an image of a chassis of a vehicle includes a speed measuring module 12, a control module 13, and a line scan camera 14. The speed measuring module 12 and the line scan camera 14 are electrically connected to the control module 13, respectively. The speed measuring module 12 is configured to measure the speed of a vehicle and transmits the measured speed of the vehicle to the control module 13. The control module 13 is configured to determine line frequency for image capturing according to the speed of the vehicle, and control the line scan camera 14 to perform image capturing on the chassis of the vehicle with the determined line frequency. A term "vehicle incoming direction" represents the direction in which the vehicle enters the detection area of the line scan camera 14, and the vehicle incoming direction may also be referred to as an entering direction.

In the embodiment of the present application, one or more line scan cameras 14 may be employed. When there are more than one line scan cameras 14, each line scan camera 14 captures an image of a portion of the vehicle. The control module 13 combines the images of the chassis of the vehicle captured by the line scan cameras 14 into an overall image of the chassis of the vehicle.

In an optional embodiment, the speed measuring module 12 measures the speed of the vehicle in real time. If the speed of the vehicle is changed, the speed measuring module transmits the changed speed to the control module 13. The control module 13 determines new line frequency for image capturing according to the changed speed. The line scan camera 14 continues the image capturing on the chassis of the vehicle with the newly determined line frequency. Here, the line frequency at which the image capturing is performed is the line frequency of the line scan camera 14.

In this embodiment, the line frequency of the line scan camera 14 is determined from the speed provided by the speed measuring module 12. When the speed of a vehicle passing through the system for acquiring an image of a chassis of a vehicle changes, namely, when the speed of the vehicle passing through the detection area changes, the line frequency of the line scan camera 14 changes accordingly, so as to ensure that images captured by the line scan camera 14 would not be deformed.

Optionally, the speed measuring module 12 is arranged on the side of the line scan camera 14 near where the vehicle enters.

The speed measuring module 12 may be mounted under the ground, on a side of the road, or on the top of the line scan camera depending on installation requirements. The speed measuring module 12 may employ speed measurement with a video, radar, photoelectric switch, or ground sensing coil according to different measurement principles. Optionally, the speed measuring module may use a video to measuring the speed, that is, the speed measuring module 12 includes an image capturing module, such as a speed measuring camera. At this point, such speed measuring module has the advantages of small volume, high anti-interference, high real-time performance, wide speed measuring range, adaptation to various types of vehicles, and easy realization of waterproof and pressure-proof functions.

In this embodiment, as an optional implementation, the speed measuring module 12 includes an image capturing module. The speed measuring module 12 continuously captures images of a moving vehicle by the image capturing module; and uses the continuously captured images to determine the number of pixels $V_p$ that the vehicle travels across per unit time on the imaging plane of the image capturing module. The control module 13 determines the line frequency for image capturing according to the number of pixels $V_p$. Here, the image capturing module may be a device having a function of image capturing such as an area scan camera. The unit time may be one second.

As an optional implementation, the speed measuring module 12 may determine the number of pixels $V_p$ that the vehicle travels across per unit time on the imaging plane of the image capturing module as follows. Specifically, the speed measuring module 12 determines the relative positions of a feature point of the vehicle in the i-th image and in the (i+1)-th image captured by the image capturing module, where i is an integer and $1 \le i < m$, and m is the total number of the images captured by the speed measuring camera. The speed measuring module 12 determines the number of pixels n between the determined two relative positions, and calculates the number of pixels $V_p$ according to the following formula:

$$V_p = n/t \qquad (1)$$

where t is the time interval between the capturing of the i-th image and the capturing of the (i+1)-th image by the speed measuring camera.

In this embodiment, as an optional implementation, the speed measuring module 12 may calculate the speed of the vehicle v by using the following formula:

$$v = V_p*(p_2/f_2)*h \qquad (2)$$

where, $V_p$ is the number of pixels that the vehicle travels across per unit time on the imaging plane of the image capturing module, $p_2$ is the size of a single pixel of the image capturing module, $f_2$ is the focal length of the image capturing module, and h is the distance between the image capturing module and the vehicle.

The unit of the speed of the vehicle v may be meters per second.

As an optional implementation, the control module 13 may calculate the line frequency for image capturing Q using the following formula:

$$Q = = V_p*(p_2/f_2)v*(f_1/p_1) \qquad (3)$$

where, v is the speed of the vehicle, $p_1$ is the size of a single pixel of the line scan camera 14, $f_1$ is the focal length of the line scan camera 14, and H is the distance between the line scan camera 14 and the vehicle.

The unit of the above line frequency Q is Hz.

The control module 13 can determine the line frequency for image capturing Q by combining the formula (2) and formula (3):

$$Q = V_p*(p_1/f_1)*(f_2/p_2)*(h/H) \qquad (4)$$

As an optional implementation, in order to accurately obtain the distance h between the vehicle and the image capturing module and the distance H between the line scan camera and the vehicle, ranging modules, such as ultrasonic ranging modules or laser ranging modules, may be used to obtain the distance h between the vehicle and the image capturing module and the distance H between the line scan camera and the vehicle in real-time.

The control module 13 transmits the determined line frequency to the line scan camera 14. The line scan camera 14 captures images of the chassis of the vehicle with the determined line frequency. In this way, the control module 13 controls the line scan camera 14 to perform image capturing on the chassis of the vehicle with the determined line frequency. In other words, this achieves line frequency of the line scan camera 14 that matches with the speed of the vehicle, thereby eliminating the deformation of images of the chassis captured by the line scan camera 14 that may occur due to stretch or compression.

In this embodiment, as an optional implementation, the control module 13 may determine the line frequency for image capturing according to the speed of the vehicle, the number of pixels per one row of the line scan camera 14 and a preset scale factor. For example, the control module 13 may determine the line frequency for image capturing Q according to the following formula:

$$Q = k*w*v \qquad (5)$$

where v is the speed of the vehicle, the unit of which may be m/s; w is the number of pixels per one row of the line scan camera 14; and k is the preset scale factor, the value of which may be in the range of 0.01-100.

In this embodiment, the preset scale factor k may be:

$$k = f_1/(p_1*w*H) \qquad (6)$$

where, $p_1$ is the size of a single pixel of the line scan camera 14, $f_2$ is the focal length of the line scan camera 14, and H is the distance between the line scan camera 14 and the vehicle. Here, $f_1/(p_1*w)$ is a constant associated with the angle of view and the physical distance of the line scan camera 14. At this point, the control module 13 can determine the line frequency for image capturing Q by combining the formulas (2), (5), and (6), as follows:

$$Q = [f_1/(p_1*w*H)]*w*[V_p*p_2/f_2*h] = V_p*(p_2/f_2)*(f_1/p_1)*(h/H) \qquad (4)$$

As an optional implementation, the direction of motion of the vehicle is from the image capturing module towards the line scan camera 14. In other words, the vehicle moves from the speed measuring module 12 towards the line scan camera 14. As another optional implementation, the direction of motion of the vehicle is from the line scan camera 14 towards the speed measuring module 12.

Figure 2:
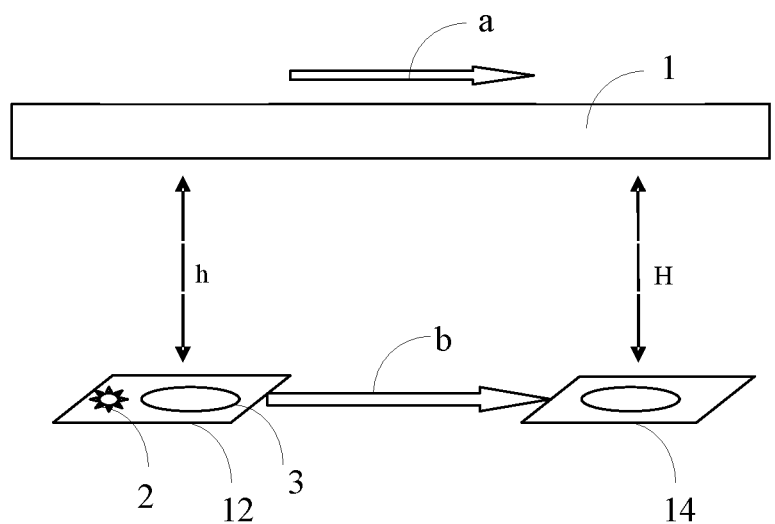
FIG. 2 is another schematic structural diagram of a system for acquiring an image of a chassis of a vehicle provided by the first embodiment of the present application.

When the direction of motion of the vehicle is from the speed measuring module 12 towards the line scan camera 14 or when the direction of motion of the vehicle is from the line scan camera 14 towards the speed measuring module 12, H=h. In the system for acquiring an image of a chassis of a vehicle shown in FIG. 2, the arrow points the direction of motion of a vehicle 1, and the arrow b points the direction from the speed measuring module 12 to the line scan camera 14. The system for acquiring an image of a chassis of a vehicle shown in FIG. 2 may further include a fill light 2 and an image capturing module 3.

The direction indicated by the arrow a is the same as the direction indicated by the arrow b, and the distance h between the speed measuring module 12 and the vehicle 1 is equal to the distance H between the line scan camera 14 and the vehicle 1. At this point, in combination with formula (4), the control module 13 can determine the line frequency for image capturing Q as:

$$Q = V_p*(p_2/f_2)*(f_1/p_1) \qquad (7)$$

In practice, in order to determine the line frequency for image capturing Q, the speed measuring module 12 and the line scan camera 14 are arranged such that the direction of motion of the vehicle is the same as the direction from the speed measuring module 12 towards the line scan camera 14, or such that the direction of motion of the vehicle is the same as the direction from the line scan camera 14 towards the speed measuring module 12. This makes it possible to, without considering measuring the distance h and the distance H by using the speed measuring module, determine the line frequency Q quickly, easily and with almost no interferences from the external, and thereby to facilitate eliminating the deformation of images that would otherwise occur during the image capturing due to stretch or compression, at a lower cost.

In this embodiment, the control module 13 may be mounted in a rain-proof control box, and the other modules can be encapsulated in a solid and airtight metal protection cylinder. The metal protection cylinder is protected by a damage-proof metal structure on the outside from water, fog and rolling damage.

The control module 13 can provide power and control signals to other modules in the system for acquiring an image of a chassis of a vehicle, execute management software, store images captured by the line scan camera 14, and the like. The control module 13 can also support the docking of a third-party platform or management software to facilitate access to a third-party management system.

In this embodiment, the speed of the vehicle is measured, the line frequency for image capturing is determined according to the speed of the vehicle, and images of the chassis of the vehicle are captured at the determined line frequency. In this way, the line frequency of the line scan camera matches with the speed of the vehicle, which eliminates the deformation of images of the vehicle captured by the line scan camera that would be otherwise occurs due to stretch or compression, and thereby improves utility of the images.

Second Embodiment

Figure 3:
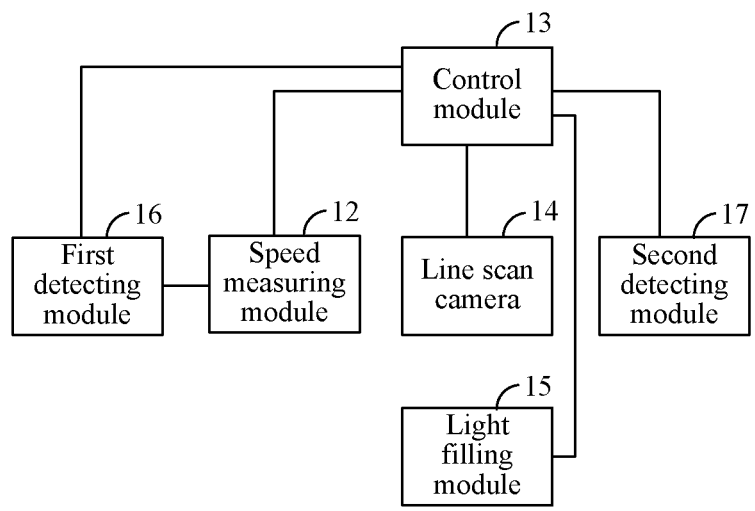
FIG. 3 is a schematic structural diagram of a system for acquiring an image of a chassis of a vehicle provided by a second embodiment of the present application.

FIG. 3 is a schematic structural diagram of a system for acquiring an image of a chassis of a vehicle provided by the second embodiment of the present application. Referring to FIG. 3, the structure of this embodiment is substantially the same as that of the first embodiment, except that in this embodiment the system for acquiring an image of a chassis of a vehicle further includes: a light filling module 15 configured to provide supplementary light for the chassis of the vehicle under the control of the control module 13 to provide sufficient illumination for performing image capturing by the line scan camera 14. For example, the light filling module 15 may fill light for the chassis of the vehicle when the control module 13 controls the line scan camera 14 to perform image capturing on the chassis of the vehicle.

A fill light is mounted in the light filling module 15. The fill light can be manufactured by a high-power LED light source, which makes the fill light have the advantages of small volume, high output power, high luminous efficiency and long service life. In order to ensure electrical safety, the fill light is powered by DC below 50V.

As an optional embodiment, the fill light in the light filling module 15 may be an infrared fill light to provide supplement light on the chassis of the vehicle at night.

As an optional embodiment, the image capturing module of the speed measuring module 12 may include an infrared light filter to filter out visible light and reduce interference of invalid light.

As an optional implementation, the light filling module 15 is arranged on a side of the line scan camera 14 and in the line scan direction of the line scan camera 14. Thus, the illumination range of the supplement light emitted by the light filling module 15 consistent with the image capturing range of the line scan camera 14, so that the line scan camera 14 can capture a clear image. The line scan direction of the line scan camera 14 refers to the direction along which a plurality of pixels in one row are arranged. For example, the line scan camera 14 has a row of 100 pixels, and the line scan direction of the line scan camera is the direction in which the 100 pixels are arranged.

The light filling module 15 may be single or plural in number, and the number of which depends on actual needs.

In the embodiment shown in FIG. 3, the system for acquiring an image of a chassis of a vehicle may further include: a first detecting module 16, which is arranged on a side of the speed measuring module 12 near where the vehicle is coming and configured to detect whether there is a vehicle. When a vehicle is detected, an incoming vehicle signal is generated and transmitted to the speed measuring module 12 to trigger the speed measuring module 12 to start measuring the speed of the vehicle. The provision of the first detecting module 16, the speed measuring module 12 can be automatically triggered to start the speed measurement.

In this embodiment, the first detecting module 16 can be electrically connected to the control module 13. When the first detecting module 16 detects that a vehicle is entering, an incoming vehicle signal is generated. When transmitting the incoming vehicle signal to the speed measuring module 12, the first detecting module may also transmits the incoming vehicle signal to the control module 13, so as to control the light filling module 15 to turn on the fill light. Here, the incoming vehicle signal can also be referred to as an incoming signal.

In this embodiment, the system for acquiring an image of a chassis of a vehicle may further include: a second detecting module 17, which is arranged on a side of the line scan camera 14 near where the vehicle leaves and is configured for detecting whether the vehicle is leaving. When the leaving of the vehicle is detected, an outgoing signal is generated and is transmitted to the control module 13, so as to trigger the control module 13 to stop the line scan camera 14 stopping the image capturing on the chassis of the vehicle.

The first detecting module 16 and the second detecting module 17 may be two sensors for sensing objects, which are respectively installed in front of and behind the line scan camera 14. Here, the front of the line scan camera 14 is the direction of the line scan camera 14 near the incoming direction of the vehicle, and the rear of the line scan camera 14 is the direction of the line scan camera 14 near the outgoing direction of the vehicle.

The first detecting module 16 and the second detecting module 17 may utilize a photoelectric sensor or a ground sensing coil, or may also utilize other types of sensors such as an ultrasonic sensor, or a visual sensor. According to the detection of the sensor, the vehicle passing over the system for acquiring an image of a chassis of a vehicle may have the following states: 1. the vehicle entering the detection area; and 2. the vehicle leaving the detection area.

When a vehicle enters the detection area, the line scan camera 14 starts capturing images of the chassis of the vehicle; and when the vehicle leaves the detection area, the line scan camera 14 stops the image capturing of the chassis of the vehicle. In the period between the vehicle entering the detection area and the vehicle leaving the detection area, if the speed of the vehicle changes, the control module 13 adjusts the line frequency of the line scan camera in real time according to the changed speed, so that the line scan camera 14 continues to capture images with the adjusted line frequency.

Figure 4:
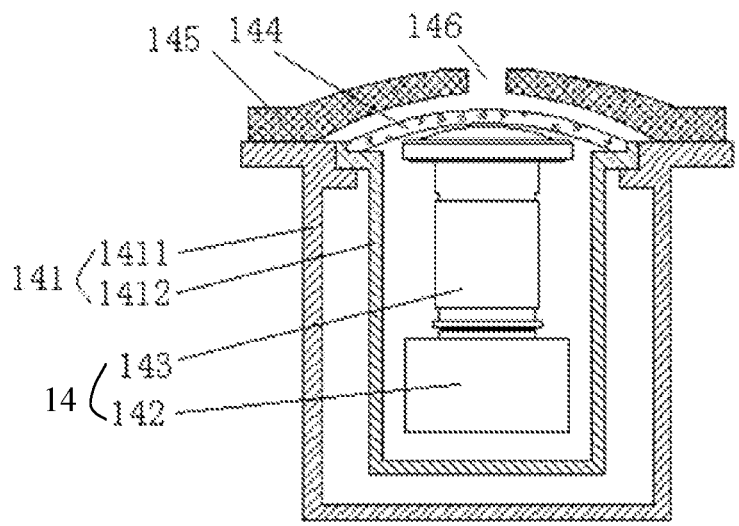
FIG. 4 is a schematic structural diagram of the structure of an embodiment of a system for acquiring an image of a chassis of a vehicle mounted with a line scan camera, provided by the present application.

FIG. 4 is a schematic structural diagram of an embodiment of a system for acquiring an image of a chassis of a vehicle mounted with a line scan camera, provided by the present application. Referring to FIG. 4, the system for acquiring an image of a chassis of a vehicle may further include: a metal protection cylinder 141; and the line scan camera 14 is arranged within the metal protection cylinder 141. The line scan camera 14 includes a line scan camera body 142 and a lens 143 that is adapted to the line scan camera body 142.

In the embodiment of the present application, the lens 143 may be selected as a wide-angle lens with an angle rang of 120-180°, depending on the usage. Optionally, the wide-angle lens may be a fisheye lens, which has high definition, good image consistency, uniform brightness, and the field of view covering a range of 180°. The fisheye lens can capture an image including clear images of the bottom of the vehicle and of the side of the wheel.

As shown in FIG. 4, a transparent cover 144 for the lens 143 is arranged on the metal protection cylinder 141. A damage-proof protection member 145 is arranged over the transparent cover 144. A light incident hole 146 is formed in the damage-proof protection member 145. External light enters the line scan camera body 142 through the light incident hole 146, the transparent cover 144, and the lens 143.

In order to better protect the line scan camera 14 and prevent the line scan camera 14 from being damaged by an external force, the metal protection cylinder 141 includes an outer cylinder 1411 and an inner cylinder 1412 sleeved in the outer cylinder 1411. The line scan camera body 142 and the lens 143 are arranged inside the inner cylinder 1412. The transparent cover 144 is supported on the inner cylinder 1412, and the damage-proof protection member 145 is supported on the outer cylinder 1411.

As an optional embodiment, the first detecting module 16 continuously detects a vehicle. When no vehicle is detected, the entire system switches to an inactive state, that is, the speed measuring module 12 does not output speed information, the fill light in the light filling module 15 is turned off, and the line scan camera 14 does not perform image capturing.

Upon the detection of a vehicle by the first detecting module 1, the speed measuring module 12 measures the speed of the vehicle, and the control module 13 sets line frequency for the line scan camera 14 according to the speed of the vehicle, so that the line scan camera 14 automatically captures images of the chassis of the vehicle with the line frequency. The fill light in the light filling module 15 can be directly turned on when the vehicle is detected by the first detecting module 16, or can be controlled to turn on by the control module 13.

While the vehicle is passing over the system for acquiring an image of a chassis of a vehicle, the speed measuring module 12 continuously measures the speed of the vehicle. When the speed of the vehicle changes, the speed measuring module 12 measures new speed information. The control module 13 determines new line frequency according to the new speed information, and changes the line frequency of the line scan camera 14 to the new line frequency, such that the image capturing rate matches with the speed of the vehicle, thereby eliminating the image distortion. This process repeats from the start.

When detecting that the vehicle has left the detection area, the second detecting module 17 sends an outgoing signal. In response to the outgoing signal, the speed measuring module 12 stops the speed measurement, the fill light in the light filling module 15 turns off, the line scan camera 14 stops image capturing, and the whole system switches to an inactive state once again.

The embodiment of the system may also be integrated with a license plate recognition module for identifying the license plate of the vehicle.

Third Embodiment

For convenience of explanation, in this embodiment, a vehicle is taken as the object for example for description.

Figure 5:
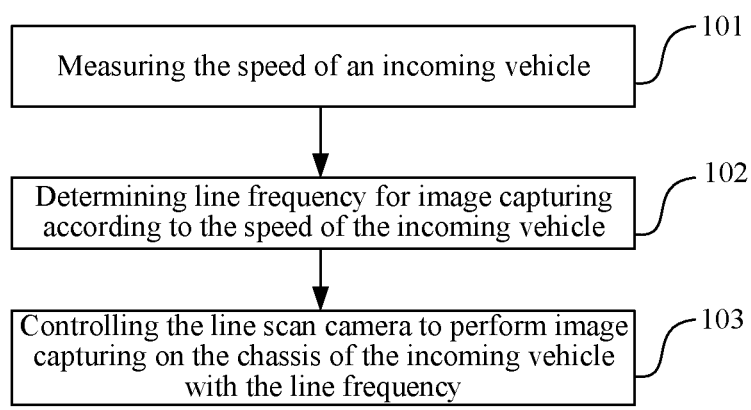
FIG. 5 is a schematic flowchart of a method for controlling image capturing provided by a third embodiment of the present application.

FIG. 5 is a schematic flowchart of a method for controlling image capturing provided by the third embodiment of the present application. As shown in FIG. 5, this embodiment of the method may include the following operations.

Step 101: measuring the speed of an incoming vehicle.

At step 101, the speed of the vehicle is measured.

In this embodiment, the speed of the vehicle can be measured in real time by a speed measuring module. The speed measuring module may be mounted under the ground, on a side of the road, or on the top of the line scan camera depending on installation requirements. The speed measuring module may employ speed measurement with a video, radar, photoelectric switch, or ground sensing coil according to different measurement principles. Optionally, the speed measuring module may use a video to measuring the speed, that is, the speed measuring module includes an image capturing module, such as a speed measuring camera. At this point, such speed measuring module has the advantages of small volume, high anti-interference, high real-time performance, wide speed measuring range, adaptation to various types of vehicles, and easy realization of waterproof and pressure-proof functions.

Step 102: determining line frequency for image capturing according to the speed of the incoming vehicle.

At step 102, the line frequency for image capturing is determined according to the speed of the vehicle.

In this embodiment, a line scan camera is employed to capture images of the chassis of the vehicle, in order to improve the resolution of the captured images of the chassis of the vehicle.

In this embodiment, the line frequency for image capturing is determined according to the speed of the vehicle. As an optional implementation, the line frequency for image capturing is determined according to the speed of the vehicle, the number of pixels per one row of the line scan camera and a preset scale factor. For example, the line frequency for image capturing can be determined according to the following formula:

$$Q = k*w*v;$$

where, Q is the line frequency for image capturing, measured in Hz; v is the speed of the vehicle, the unit of which may be m/s; w is the number of pixels per one row of the line scan camera 14; and k is the preset scale factor, the value of which may be in the range of 0.01-100.

Step 103: controlling the line scan camera to perform image capturing on the chassis of the incoming vehicle with the line frequency.

At step 103, the line scan camera is controlled to captures images of the chassis of the vehicle at the determined line frequency. Here, the vehicle is an object, and the controlling of the line scan camera to perform image capturing on the chassis of the vehicle is to control the line scan camera to perform image capturing on the object.

In this embodiment, the line frequency of the line scan camera can be changed to the line frequency determined according to the speed of the vehicle, to control image capturing of the line scan camera performed on the chassis of the vehicle.

In this embodiment, the speed of the vehicle is measured, the line frequency for image capturing is determined according to the speed of the vehicle, and the line scan camera is controlled to capture images of the chassis of the vehicle at the determined line frequency. In this way, the line frequency of the line scan camera matches with the speed of the vehicle, which eliminates the deformation of images of the chassis of the vehicle captured by the line scan camera that would be otherwise occurs due to stretch or compression, and thereby improves utility of the images.

Fourth Embodiment

For convenience of explanation, in this embodiment, the vehicle is taken as an object for example for description.

Figure 6:
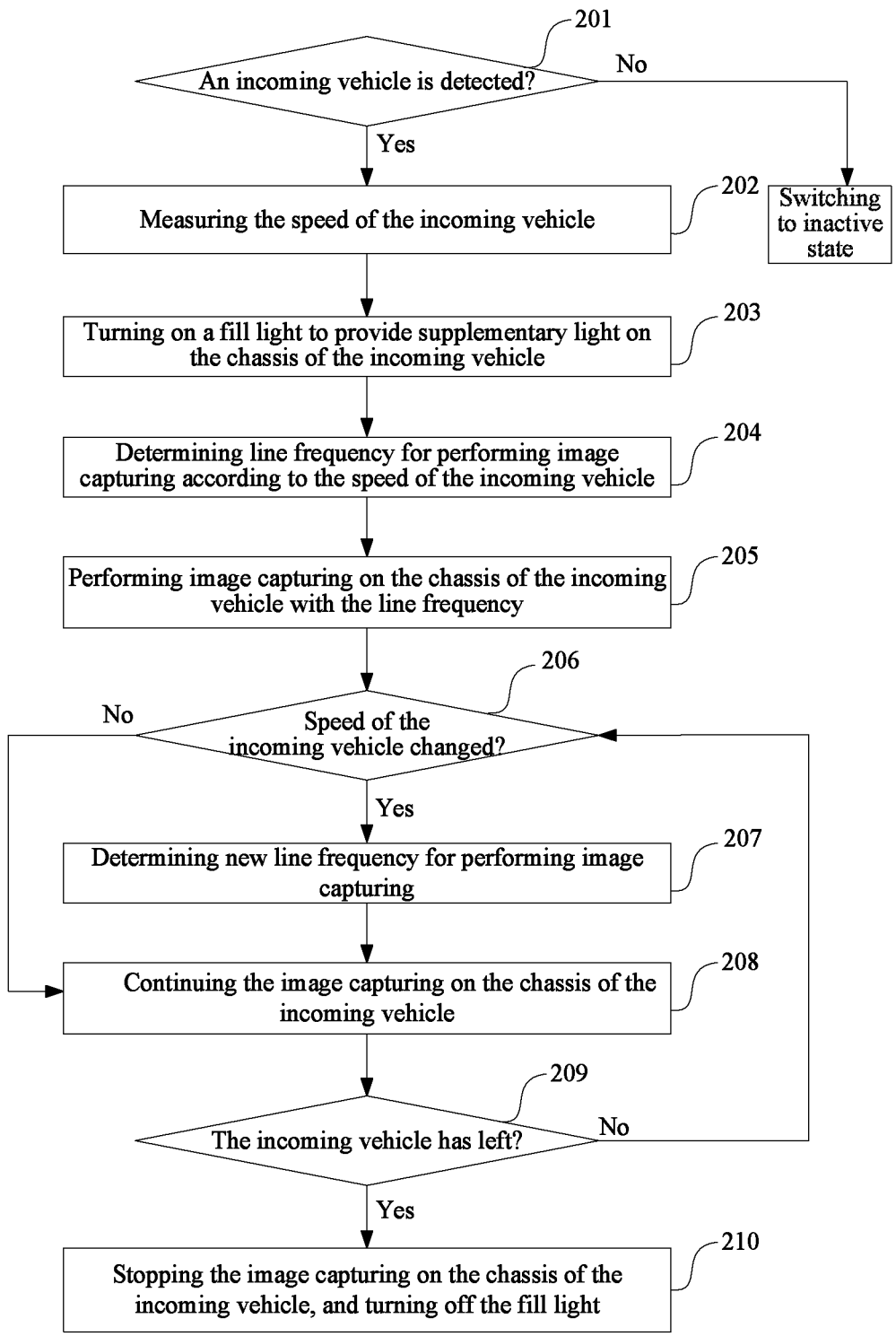
FIG. 6 is a schematic flowchart of a method for controlling image capturing provided by a fourth embodiment of the present application.

FIG. 6 is a schematic flowchart of a method for controlling image capturing provided by the fourth embodiment of the present application. As shown in FIG. 6, the method in this embodiment may include the following operations.

Step 201: detecting whether there is an incoming vehicle.

At step 201, the incoming of a vehicle is detected.

This embodiment can detect in real time whether a vehicle is in a predetermined detection area. Specifically, a vehicle detecting module composed of a sensor and a logic processing unit may be used to detect the presence of a vehicle in the predetermined detection area. When a vehicle is detected in the predetermined detection area, the method proceeds to step 202.

The sensor may be selected as a photoelectric sensor or a ground sensing coil; and may also be selected from other types of sensors, such as an ultrasonic sensor, a visual sensor, or the like.

Step 202: measuring the speed of the incoming vehicle.

At step 202, the speed of the vehicle is measured.

In this embodiment, the process of measuring the speed of the vehicle is similar to the step 101 of the foregoing method embodiment, and will not be repeated herein.

Step 203: turning on a fill light to provide supplementary light on the chassis of the incoming vehicle.

At step 203, the fill light is turned on to provide supplementary light on the chassis of the vehicle.

In order to avoid that dim light on the vehicle chassis affects the image capturing, in the embodiment, when a vehicle in the predetermined detection area is detected, the fill light is turned on to provide supplementary light on the chassis of the vehicle to provide sufficient light for image capturing.

Step 204: determining line frequency for image capturing according to the speed of the incoming vehicle.

At step 204, line frequency for image capturing according to the speed of the vehicle is determined.

In this embodiment, the process of determining the line frequency for image capturing is similar to the step 102 of the foregoing method embodiment, and will not be repeated herein.

The steps 203 and 204 may be performed in any order, which is not limited herein.

Step 205: controlling the line scan camera to perform image capturing on the chassis of the incoming vehicle with the line frequency.

At step 205, the line scan camera is controlled to capture images of the chassis of the vehicle with the determined line frequency.

In this embodiment, the process of controlling the line scan camera to perform image capturing on the chassis of the vehicle is similar to the step 103 of the above method embodiment, and is not repeated herein.

Step 206: detecting a change in the speed of the incoming vehicle.

At step 206, a detection of a change in the speed of the vehicle is performed.

After the vehicle enters the detection area, its speed may change, for example, slow down.

In this embodiment, the speed of the vehicle may be monitored in real time as to whether it changes. If it is detected that the speed of the vehicle has changed, the method proceeds to step 207. If no change in the speed of the vehicle is detected, the line scan camera continues to perform image capturing on the chassis of the vehicle.

Step 207, determining new line frequency for image capturing.

In this embodiment, the process of determining the new line frequency for image capturing based on the changed speed is similar to the step 102 of the foregoing method embodiment, and is not repeated herein.

Step 208: continuing the image capturing on the chassis of the incoming vehicle.

At step 208, the line scan camera is controlled to continue the image capturing on the chassis of the vehicle.

In this embodiment, if the speed of the vehicle changes, the image capturing on the chassis of the vehicle is continued with the newly determined line frequency. Otherwise, the image capturing for the chassis of the vehicle is continued with the previously determined line frequency.

In this embodiment, after the vehicle enters the detection area, even if the speed of the vehicle changes, the line frequency for the line scan camera can be determined again according to the changed speed, so that the line frequency of the line scan camera always matches the speed of the vehicle. This avoids stretch or compression in part that may occur on images of the chassis of the vehicle captured by the line scan camera.

Step 209: detecting leaving of the incoming vehicle.

At step 209, it is to detect whether the vehicle leaves.

In order to avoid that the line scan camera is always capturing images, it is necessary to detect whether the vehicle has left, so as to timely control the line scan camera to stop capturing images of the chassis of the vehicle. If it is detected that the vehicle has left, the method proceeds to step 210.

Step 210: stopping the image capturing on the chassis of the incoming vehicle.

At step 210, the image capturing for the chassis of the vehicle is stopped.

In this embodiment, if it is detected that the vehicle has left, the line scan camera can be controlled to stop the image capturing on the chassis of the vehicle, and to stay in the inactive or sleep state to save power. At the same time, the fill light can be turned off to stop providing supplementary light.

In this embodiment, the speed of the vehicle is measured, the line frequency of the image capturing is determined according to the speed of the vehicle, and images of the chassis of the vehicle are captured with the determined line frequency. When the speed of the vehicle changes, new line frequency for the line scan camera can be determined according to the changed speed timely, so that the line frequency of the line scan camera always matches the speed of the vehicle. This avoids local stretch or local compression that may occur on images of the chassis of the vehicle captured by the line scan camera, which improves the utility of the captured images of the chassis of the vehicle.

Fifth Embodiment

Figure 7:
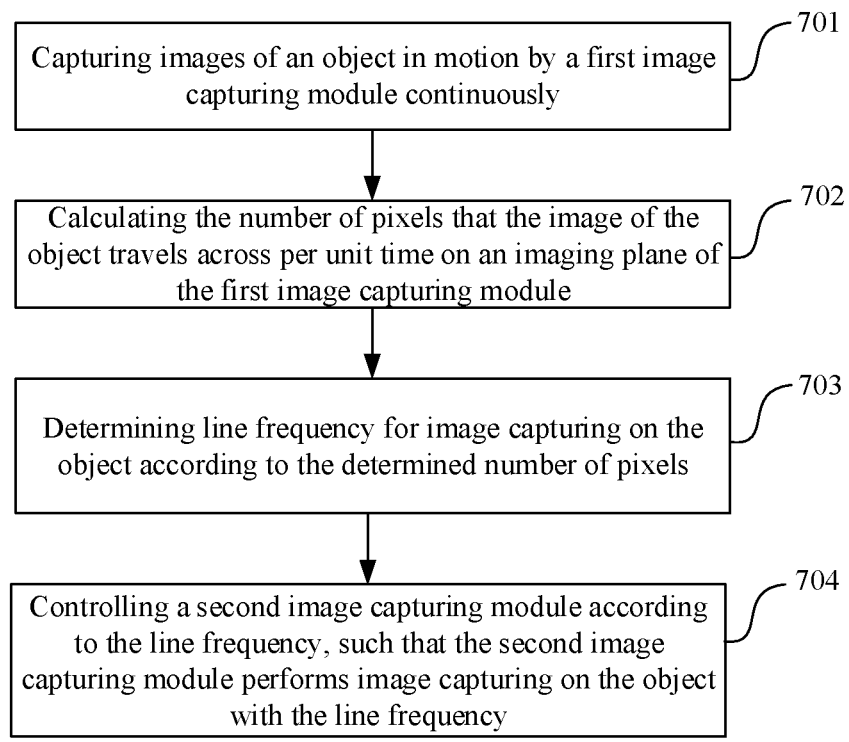
FIG. 7 is a schematic flowchart of a method for controlling image capturing provided by a fifth embodiment of the present application.

FIG. 7 is a schematic flowchart of a method for controlling image capturing provided by the fifth embodiment of the present application. As shown in FIG. 7, the method for controlling image capturing method of this embodiment may include the following operations.

Step 701: capturing images of an object in motion by a first image capturing module continuously.

In this embodiment, the first image capturing module is the image capturing module illustrated in the first to fourth embodiments, which may be a speed measuring camera. The object may be a vehicle. A device with a function of image capturing, such as an area scan camera, can be used to capture at least two images of the vehicle in motion.

Step 702: calculating the number of pixels that the object travels across per unit time on an imaging plane of the first image capturing module.

At step 702, the number of pixels $V_p$ that the moving object travels across per unit time on the imaging plane of the first image capturing module is calculated using the continuously captured images.

In this embodiment, the number of pixels that the image of the object has traveled through per unit time during moving on the imaging plane may be calculated according to two adjacent images captured. The unit time can be every second.

Step 703: determining line frequency for image capturing on the object according to the determined number of pixels.

At step 703, the speed of the object is determined according to the determined number of pixels $V_p$; and the line frequency for image capturing on the object is determined according to the speed of the object.

The steps 701-703 together achieve the operations of measuring the speed of the object and determining the line frequency for image capturing on the object according to the speed of the object.

Step 704: controlling a second image capturing module according to the line frequency, such that the second image capturing module performs image capturing on the object with the line frequency.

At step 704, the second image capturing module is controlled to capture images of the object with the determined line frequency.

In this embodiment, a pulse control signal may be transmitted to the line scan camera to cause the line scan camera to scan the object at the determined line frequency to obtain an image of the object.

The second image capturing module is a line scan camera. The line scan camera may be single or plural in number. When more than one line scan camera is used, each line scan camera captures an image of a part of the vehicle. The images of the object obtained by the respective line scan cameras can be combined to obtain an entire image of the object.

In this embodiment, the first image capturing module captures images of the object in motion. The number of pixels that the images of the object travel through on the imaging plane of the first image capturing module per unit time is determined. The line frequency for image capturing on the object is determined according to the determined number of pixels. Thereby, the image capturing frequency of the second image capturing module, i.e., of the line scan camera, can be controlled according to the determined line frequency, so that the second image capturing module captures images of the object with the line frequency. In this way, even if the speed of the object changes, the embodiment can facilitate to avoid deformation of images that may occur due to compression or stretch during the image capturing of the object.

Sixth Embodiment

Figure 8:
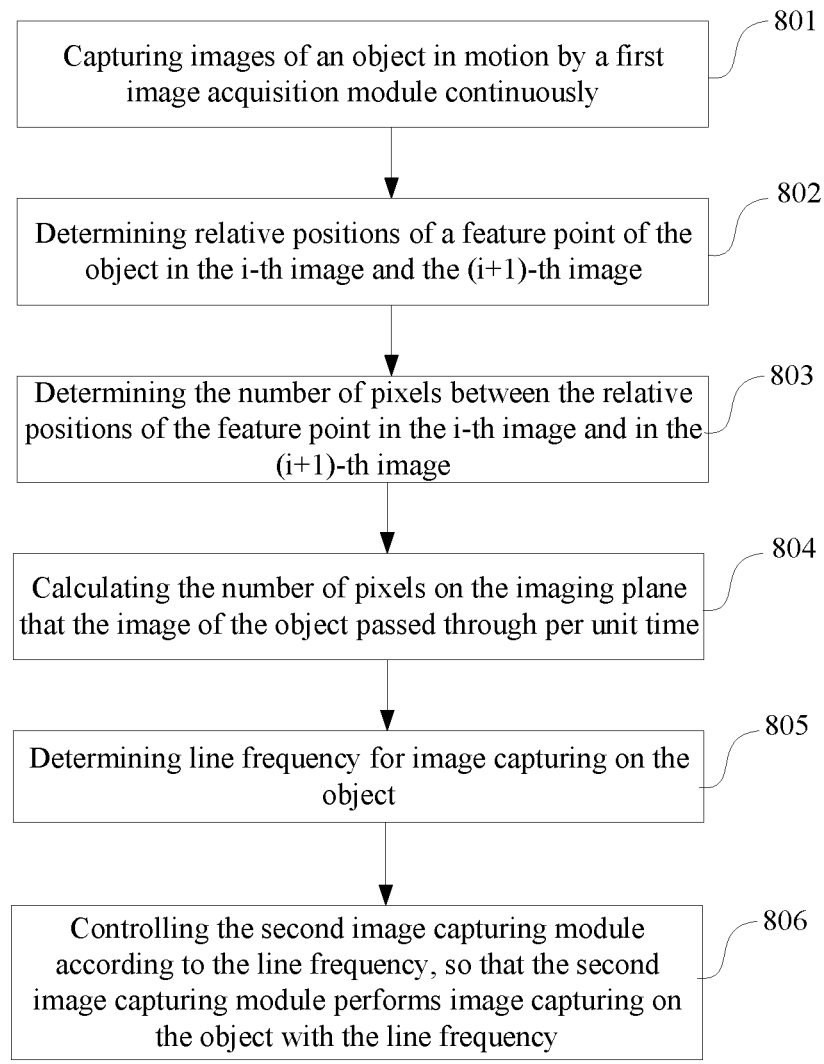
FIG. 8 is a schematic flowchart of a method for controlling image capturing provided by a sixth embodiment of the present application.

FIG. 8 is a schematic flowchart of a method for controlling image capturing provided by the sixth embodiment of the present application. Referring to FIG. 8, the method for controlling image capturing of this embodiment may include the following operations.

Step 801: capturing images of an object in motion by a first image acquisition module continuously.

In this embodiment, the step of capturing images of object in motion continuously is similar to the step 701 of the foregoing method embodiment, and is not repeated herein.

Step 802: determining relative positions of a feature point of the object in the i-th image and the (i+1)-th image.

At step 802, the relative positions of the feature point of the object in the i-th and (i+1)-th images captured by the image capturing module are determined, where i is an integer and $1 \leq i < m$, and m is the total number of the images captured by the first image capturing module.

In this embodiment, in order to facilitate determining the number of pixels that the image of the object has traveled through per unit time on the imaging plane, a feature point may be selected on the object. The number of pixels on the imaging plane that the image of the object traveled through during moving per unit time can be determined by determining the number of pixels on the imaging plane that the feature point passed through per unit time during moving.

Step 803: determining the number of pixels between the relative positions of the feature point in the i-th image and in the (i+1)-th image.

At step 803, the number of pixels n between the determined two relative positions.

In this embodiment, according to the two relative positions of the feature point of the object in the i-th image and in the (i+1)-th image, the number of pixels for the feature point of the object between the two relative positions can be determined.

Step 804: calculating the number of pixels on the imaging plane that the image of the object passed through per unit time.

In this embodiment, the number of pixels $V_p$ passed through by the image of the object per unit time on the imaging plane of the first image capturing module may be determined according to the following formula;

$$V_p = n/t;$$

where n is the number of pixels between the two relative positions of the feature point in the i-th and the (i+1)-th images; t is the time interval between the capturing of the i-th image and the capturing of the (i+1)-th image by the first image capturing module.

Step 805: determining line frequency for image capturing on the object.

In this embodiment, the distance between the lens of the first image capturing module and the object is h, and the distance between the lens of the second image capturing module and the object is H. If the line linking the lens of the first image capturing module and the lens of the second image capturing module is not parallel to the direction of motion of the object, h and H are not equal.

The distance between the lens of the first image capturing module and the object is the distance between the first image capturing module and the object. The distance between the lens of the second image capturing module and the object is the distance between the second image capturing module and the object. In this embodiment, the second image capturing module is a line scan camera.

In this embodiment, the speed v of the object can be determined according to the following formula:

$$v = V_p * (p_2/f_2) * h;$$

where $V_p$ is the number of pixels on the imaging plane of the first image capturing module that the object travels across per unit time, $p_2$ is the size of a single pixel of the first image capturing module, $f_2$ is the focal length of the first image capturing module, and h is the distance between the first image capturing module and the object.

In this embodiment, the line frequency Q for capturing an image of the object may be determined according to the following formula:

$$Q=v*(f_1/p_1)/H=V_p*(p_2/f_2)*(f_1/p_1)*(h/H);$$

where $V_p$ is the number of pixels on the imaging plane of the first image capturing module that the image of the object passes through per unit time; $p_2$ is the size of a single pixel of the first image capturing module, and the unit of which may be millimeter; $f_2$ is the focal length of the first image capturing module, the unit of which may be millimeters; $p_1$ is the size of a single pixel of the second image capturing module, the unit of which may be millimeters; $f_1$ is the focal length of the second image capturing module, and the unit of which may be millimeters; h is the distance between the first image capturing module and the object, the unit of which can be mm; H is the distance between the second image capturing module and the object, the unit of which can be millimeter; and the character of * indicates multiplication, and the character of/indicates division.

In this embodiment, when the object passes through the first image capturing module, the distance h between the first image capturing module and the object is determined; and when the object passes through the second image capturing module, the distance H between the second image capturing module and the object is determined.

In order to accurately obtain the distance h between the object and the first image capturing module and the distance H between the object and the second image capturing module, in this embodiment, a ranging module, such as the ultrasonic ranging module or the laser ranging module, may be respectively selected to obtain the distance h between the first image capturing module and the object and the distance H between the second image capturing module and the object in real time respectively.

Step 806: controlling the second image capturing module according to the line frequency, so that the second image capturing module performs image capturing on the object with the line frequency.

In this embodiment, the second image capturing module is a line scan camera.

The line scan camera can be controlled according to the line frequency, that is, a pulse control signal is transmitted to the line scan camera, so that the line scan camera scans the object at the line frequency to obtain an image of the object.

In this embodiment, as an optional implementation, the direction of motion of the object is from the first image capturing module towards the second image capturing module.

In this embodiment, it only needs to determine line frequency for image capturing of the object by determining the distances between the first image capturing module and the object and between the line scan camera and the object respectively and determining the number of pixels on the imaging plane of the first image capturing module that the image of the object passes through per unit time, and control an image capturing frequency of the second image capturing module according to the line frequency, so that the second image capturing module performs image capturing on the object with the line frequency. Thus, even if the speed of the object changes, the embodiment can facilitate to avoid deformation of images that may occur due to compression or stretch during the image capturing of the object.

Seventh Embodiment

Figure 9:
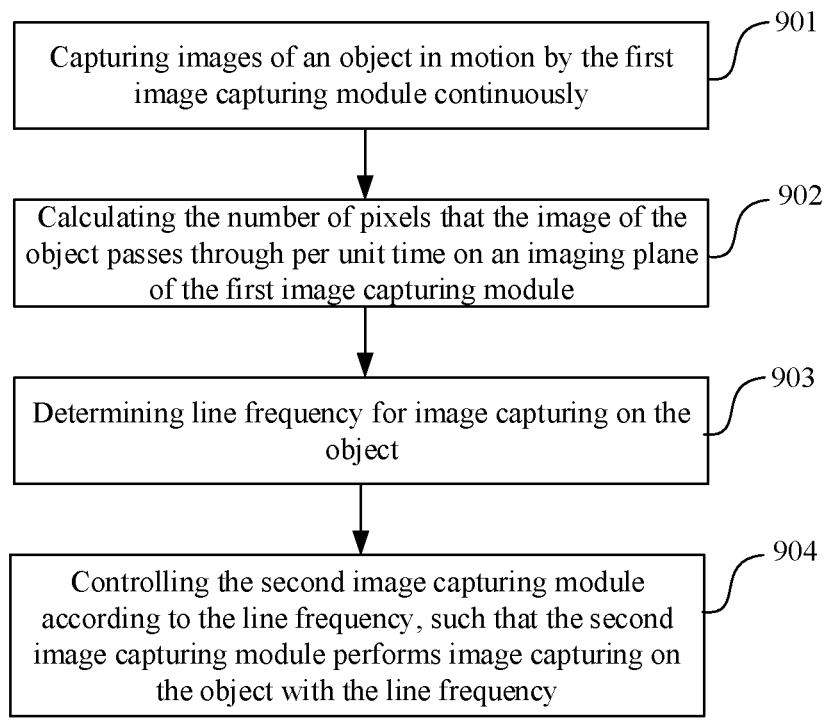
FIG. 9 is a schematic flowchart of a method for controlling image capturing provided by a seventh embodiment of the present application.

FIG. 9 is a schematic flowchart of a method for controlling image capturing provided by the seventh embodiment of the present application. The embodiment is applicable to the situation where the linking line linking the lens of the first image capturing module and the lens of the second image capturing module is parallel or almost parallel to the direction of motion of the object. In other words, this embodiment is applicable to the situation where the distance h between the lens of the first image capturing module and the object and the distance H between the lens of the second image capturing module and the object is equal or almost equal.

Referring to FIG. 9, the embodiment of the method for controlling image capturing may include the following operations.

Step 901: Capturing images of an object in motion by the first image capturing module continuously.

In this embodiment, the process of capturing images of an object by the first image capturing module continuously is similar to the step 701 of the foregoing method embodiment, and is not repeated herein.

Step 902: calculating the number of pixels that the image of the object passes through per unit time on an imaging plane of the first image capturing module.

In this embodiment, the process of calculating the number of pixels that the image of the object passes through per unit time on the imaging plane of the first image capturing module is similar to the steps 802 to 804 of the foregoing method embodiment, and is not repeated herein.

Step 903: determining line frequency for image capturing on the object.

In this embodiment, the line frequency Q for capturing an image of the object may be determined according to the following formula:

$$Q=V_p*(p_2/f_2)*(f_1/p_1);$$

where $V_p$ is the number of pixels that the image of the object passes through per unit time on the imaging plane of the first image capturing module; $p_2$ is the size of a single pixel of the first image capturing module, and the unit of which may be millimeter; $f_2$ is the focal length of the first image capturing module, the unit of which may be millimeter; $p_1$ is the size of a single pixel of the second image capturing module, the unit of which may be millimeter; and $f_1$ is the focal length of the second image capturing module, and the unit of which may be millimeter.

Step 904: controlling the second image capturing module according to the line frequency, such that the second image capturing module performs image capturing on the object with the line frequency.

In this embodiment, the second image capturing module is a line scan camera.

The line scan camera can be controlled according to the line frequency by transmitting a pulse control signal to the line scan camera, so that the line scan camera scans the object at the line frequency to obtain an image of the object.

In this embodiment, the process of controlling the second image capturing module with the line frequency is similar to the step 704 of the foregoing method embodiment, and is not repeated herein.

In this embodiment, the first image capturing module and the second image capturing module can be arranged in parallel at a close distance. The closer first image capturing module and the second image capturing module is arranged, the closer to parallel that between the lining line linking the lenses of the image capturing modules and the direction of motion of the object will be. Of course, the present application is not limited thereto, and the distance between the first image capturing module and the second image capturing module may be relatively large, as long as the line linking the lenses of the two image capturing modules is parallel or nearly parallel to the direction of motion of the object. Alternatively, the line linking the lenses of the two image capturing modules is parallel to the direction of motion of the object, that is, the distances h and H are equal.

In this embodiment, as an optional implementation, the direction of motion of the object may be, but not limited to, from the first image capturing module towards the second image capturing module. When the first image capturing module and the second image capturing module are arranged relatively close, the direction of motion of the object may be from the second image capturing module towards the first image capturing module. At this point, the image capturing of the second image capturing module can be triggered by the first image capturing module or the control module.

The control module is electrically connected to the first image capturing module, and the control module is electrically connected to the second image capturing module.

In this embodiment, due to the specific arrangement of the first image capturing module and the second image capturing module, the distances h and H are equal or almost equal. Therefore, in the practical process of determining the line frequency for image capturing Q on the object, it is not necessary to measure the distance h and the distance H by using ranging modules. It only needs to measure the number of pixels $V_p$ that the image of the object passes through per unit time on the imaging plane of the first image capturing module, so as to determine the line frequency Q according to the parameters intrinsic to the first image capturing module and the second image capturing module quickly, conveniently and without being affected by external interferences, and thereby facilitate eliminating the deformation of images that would otherwise occur during the image capturing due to stretch or compression, at a lower cost.

Eighth Embodiment

Figure 10:
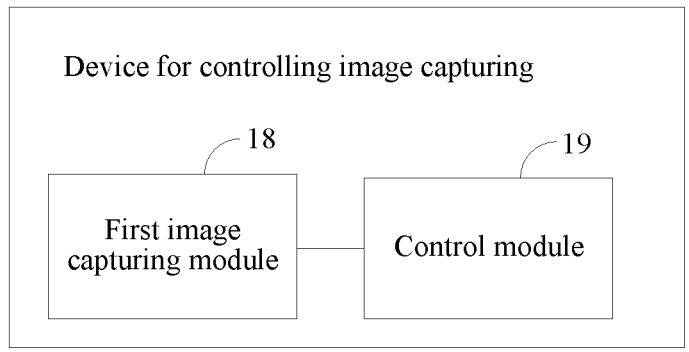
FIG. 10 is a schematic structural diagram of a device for controlling image capturing provided by an eighth embodiment of the present application.

FIG. 10 is a schematic structural diagram of a device for controlling image capturing provided by the eighth embodiment of the present application. Referring to FIG. 10, the device for controlling image capturing of the present embodiment may include: a first image capturing module 18 and a control module 19. The first image capturing module 18 is configured to capture images of an object in motion continuously. The control module 19 is configured to determine the number of pixels that the image of the object passes through per unit time on an imaging plane of the first image capturing module; determine line frequency for image capturing on the object according to the determined number of pixels; and control a second image capturing module according to the line frequency, so that the second image capturing module performs image capturing on the object with the line frequency. The second image capturing module is a line scan camera.

In this embodiment, the first image capturing module 18 may include an area scan camera; and the second image capturing module may include at least one line scan camera.

In this embodiment, the device can be used for capturing images of a chassis of a moving vehicle. The first image capturing module 18 and the second image capturing module may be arranged one after another and at a distance. The first image capturing module 18 is arranged in the direction along which vehicle enters, and the second image capturing module is arranged after the first image capturing module 18.

After determining the line frequency for image capturing on the object, the control module 19 may transmit a pulse control signal to the second image capturing module, and the second image capturing module is triggered to perform image capturing on the chassis of the vehicle with the determined line frequency. The pulse control signal contains the determined line frequency.

The device provided by this embodiment may be used to implement the technical solution of the method embodiment shown in FIG. 7. The implementation principle and technical effects are similar, and details are not described herein again.

Ninth Embodiment

The structure of the device of this embodiment is basically the same as that of the eighth embodiment, except that in this embodiment, the control module 19 determines the number of pixels that the image of the object passes through per unit time on the imaging plane of the first image capturing module, can specifically include:

determining relative positions of a feature point of the object in the i-th image and in the (i+1)-th image, wherein i is an integer and 1≤i<m, and m is the total number of the images captured by the first image capturing camera;

determining the number of pixels n for the feature point between the two determined relative positions in the i-th image and the (i+1)-th image; and determining the number of pixels $V_p$ that the image of the object passes through per unit time on the imaging plane according to the following formula;

$$V_p = n/t;$$

where t is the time interval between the capturing of the i-th image and the capturing of the (i+1)-th image.

Tenth Embodiment

In this embodiment, the distance between the lens of the first image capturing module and the object is h, and the distance between the lens of the second image capturing module and the object is H.

The line linking the lens of the first image capturing module and the lens of the second image capturing module is not parallel to the direction of motion of the object, that is, the distances h and H are not equal.

The structure of the device of this embodiment is substantially the same as that of the embodiment 9, except that in this embodiment, the device for controlling image capturing may further include a first ranging module and a second ranging module. The first ranging module is configured to measure the distance between the lens of the first image capturing module and the object when the object passes through the first image capturing module. The second ranging module is configured to determine the distance between the lens of the second image capturing module and the object when the object passes through the second image capturing module.

In this embodiment, the control module 19 determines the line frequency for image capturing on the object according to the number of pixels that the image of the object travels across on the imaging plane per unit time, by:

determining the line frequency for image capturing Q on the object according to the following formula:

$$Q=V_p*(p_2/f_2)*(f_1/p_1)*(h/H);$$

where $V_p$ is the number of pixels that the image of the object passed through per unit time on the imaging plane of the first image capturing module; $p_2$ is the size of a single pixel of the first image capturing module, the unit of which may be millimeter; $f_2$ is the focal length of the first image capturing module, the unit of which may be millimeter; $p_1$ is the size of a single pixel of the second image capturing module, the unit of which may be millimeter; $f_1$ is the focal length of the second image capturing module, and the unit of which may be millimeter; h is the distance between the lens of the first image capturing module and the object, the unit of which may be millimeter; and H is the distance between the lens of the second image capturing module and the object, the unit of which may be millimeter.

In order to accurately obtain the distance h between the object and the lens of the first image capturing module and the distance H between the object and the lens of the second image capturing module, in this embodiment, ranging modules selected from ultrasonic ranging modules or laser ranging modules can be used to obtain the distance h between the lens of the first image capturing module and the object and to obtain the distance H between the lens of the second image capturing module and the object in real-time.

In this embodiment, the direction of motion of the object may be selected as from the first image capturing module towards the second image capturing module.

The first ranging module, the second ranging module and the control module 19 of the device of this embodiment are also applicable to the fifth embodiment.

The device in this embodiment may be used to implement the technical solution of the method embodiment shown in FIG. 8. The implementation principle and technical effects are similar, and are not repeated herein.

Eleventh Embodiment

This embodiment is applicable to the case where the line lining the lens of the first image capturing module and the lens of the second image capturing module is parallel or nearly parallel to the direction of motion of the object, namely the case where the distance h between the first image capturing module and the object and the distance H between the lens of the second image capturing module and the object are equal or nearly equal to each other.

The structure of the device of this embodiment is basically the same as that of the eighth embodiment, except that the control module 19 determines the line frequency for image capturing on the object according to the number of pixels that the image of the object passes through on the imaging plane of the first image capturing module per unit time, by determining the line frequency for image capturing Q on the object according to the following formula:

$$Q=V_p*(p_2/f_2)*(f_1/p_1);$$

wherein, $V_p$ is the number of pixels that the image of the object passes through on the imaging plane of the first image capturing module per unit time; $p_2$ is the size of a single pixel of the first image capturing module, the unit of which may be millimeter; $f_2$ is the focal length of the first image capturing module, the unit of which may be millimeter; $p_1$ is the size of a single pixel of the second image capturing module, the unit of which may be millimeter; and $f_1$ is the focal length of the second image capturing module, the unit of which may be millimeter.

In this embodiment, the first image capturing module and the second image capturing module can be arranged in parallel at a close distance. The closer first image capturing module and the second image capturing module is arranged, the closer to parallel that between the lining line linking the lenses of the image capturing modules and the direction of motion of the object will be. Of course, the present application is not limited thereto, and the distance between the first image capturing module and the second image capturing module may be relatively large, as long as the line linking the lenses of the two image capturing modules is parallel or nearly parallel to the direction of motion of the object. Alternatively, the line linking the lenses of the two image capturing modules is parallel to the direction of motion of the object, that is, the distance h between the lens of the first image capturing module and object and the distance H between the lens of the second image capturing module and object are equal.

The direction of motion of the object may be selected as from the first image capturing module towards the second image capturing module.

In this embodiment, due to the specific arrangement of the first image capturing module and the second image capturing module, the distances h and H are equal or almost equal. Therefore, in the practical process of determining the line frequency for image capturing Q on the object, it is not necessary to measure the distance h and the distance H by using ranging modules. It only needs to measure the number of pixels $V_p$ that the image of the object passes through per unit time on the imaging plane of the first image capturing module, so as to determine the line frequency Q according to the parameters intrinsic to the first image capturing module and the second image capturing module quickly, conveniently and without being affected by external interferences, and thereby facilitate eliminating the deformation of images that would otherwise occur during the image capturing due to stretch or compression, at a lower cost.

In this embodiment, the first image capturing module may further be provided with an infrared fill light and an infrared light filter, in order to obtain an image of the object in a relatively dark environment. During daytime, the invisible light can be filtered through the infrared filter to reduce the interference of invalid light; and the infrared fill light can be turned on at night to provide supplementary light for the image capturing, so that desired images can be acquired throughout the day.

Twelfth Embodiment

This embodiment of the present application further provides a device for controlling image capturing, including: a speed measuring unit, a determining unit, and a control unit.

The speed measuring unit is configured to measure the speed of an object.

The determining unit is configured to determine line frequency for image capturing according to the speed of the object.

The control unit is configured to control a line scan camera to perform image capturing on the object with the determined line frequency.

Optionally, the speed measuring unit is further configured to capture images of the object in motion continuously by using an image capturing module, and to calculate the number of pixels $V_P$ that the object travels across per unit time on an imaging plane of the image capturing module by using the continuously captured images.

The determining unit is further configured to determine the line frequency for image capturing according to the calculated number of pixels $V_p$.

Optionally, the speed measuring unit can be specifically configured to:

determine relative positions of a feature point of the object both in the i-th image and in the (i+1)-th image captured by the image capturing module, wherein i is an integer and 1≤i<m, and m is the total number of the images captured by the image capturing module;

determine the number of pixels n between the determined two relative positions; and determine the number of pixels $V_p$ that the object travels across per unit time on the imaging plane of the image capturing module according to the following formula:

$$V_p = n/t;$$

wherein t is a time interval between the capturing of the i-th image and the capturing of the (i+1)-th image by the image capturing module.

Optionally, the determining unit can be specifically used to:

determine the line frequency for image capturing Q according to the following formula when a linking line linking the image capturing module and the line scan camera is parallel to a direction of motion of the object:

$$Q = V_p * (p_2/f_2) * (f_1/p_1);$$

wherein, $V_p$ is the number of pixels that the object travels across per unit time on the imaging plane of the image capturing module; $p_2$ is a size of a single pixel of the image capturing module; $f_2$ is a focal length of the image capturing module; $p_1$ is a size of a single pixel of the line scan camera; and $f_1$ is the focal length of the line scan camera.

Optionally, the direction of motion of the object is the direction from the image capturing module to the line scan camera.

Optionally, the determining unit may be specifically configured to:

determine the line frequency for image capturing according to the speed of the object, the number of pixels per one row of the line scan camera and a preset scale factor.

Optionally, the determining module can be specifically configured to:

calculate the line frequency for image capturing Q according to the following formula:

$$Q = k*w*v;$$

wherein v is the speed of the object; w is the number of pixels per one row of the line scan camera; and k is the preset scale factor.

Optionally, the speed measuring unit is specifically configured to: detect a change in the speed of the object, and in response to that a change in the speed of the object is detected, determine the changed speed.

The determining unit is specifically configured to: determine new line frequency for image capturing according to the changed speed.

The control unit is specifically configured to: continue the image capturing on the object with the newly determined line frequency.

Optionally, the device for controlling image capturing may further include: a light filling unit, configured to provide supplementary light on the object while the line scan camera is controlled to perform image capturing on the object.

Optionally, the device for controlling image capturing may further include: a first detecting unit, configured to detect incoming of the object, generate an incoming signal in response to that the incoming of the object is detected, and transmit the incoming signal to the speed measuring unit to trigger the speed measuring unit to measure the speed of the object.

Optionally, the device for controlling image capturing may further include: a second detecting unit, configured to detect leaving of the object; generate an outgoing signal in response to that the leaving of the object is detected, to trigger the control unit to control the line scan camera to stop the image capturing on the object.

Optionally, the object is a vehicle.

The control unit can be specifically configured to control the line scan camera to perform image capturing on the chassis of the vehicle according to the line frequency.

In the embodiment of the present application, the speed of the object is measured, the line frequency of the image capturing is determined according to the speed of the object, and capturing an image of the object with the determined line frequency. The line frequency of the line scan camera can thus match the speed of the object, which can effectively eliminate deformation of images of the object captured by a line scan camera, which would otherwise occur due to stretch or compression, and thereby improve the utility of these images.

Thirteenth Embodiment

Figure 11:
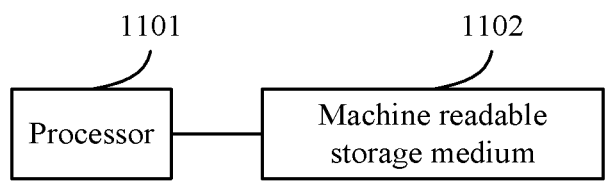
FIG. 11 is a schematic structural diagram of an electronic device provided by a thirteenth embodiment of the present application.

Based on the same inventive concept, an embodiment of the present application further provides an electronic device, as shown in FIG. 11. The electronic device includes a processor 1101 and a machine-readable storage medium 1102. The machine-readable storage medium stores machine executable instructions executable by the processor. The machine executable instructions, when executed by the processor, cause the processor to carry out the method for controlling image capturing, which includes:

measuring the speed of an object;

determining the line frequency for image capturing according to the speed of the object; and controlling a line scan camera to perform image capturing on the object with the line frequency.

In the embodiment of the present application, the speed of the object is measured, the line frequency of the image capturing is determined according to the speed of the object, and capturing an image of the object with the determined line frequency. The line frequency of the line scan camera can thus match the speed of the object, which can effectively eliminate deformation of images of the object captured by a line scan camera, which would otherwise occur due to stretch or compression, and thereby improve the utility of these images.

The machine-readable storage medium 1102 may include a RAM (Random Access Memory), and may also include an NVM (Non-Volatile Memory), such as at least one magnetic storage disk. Additionally, the machine-readable storage medium 1102 can also be at least one storage device located remotely from the aforementioned processor.

The processor 1101 may be a general-purpose processor, including a CPU (Central Processing Unit), an NP (Network Processor), or the like; or a DSP (Digital Signal Processing) or an ASIC (Application Specific Integrated Circuit), FPGA

Fourteenth Embodiment

Based on the same inventive concept, an embodiment of the present application further provides a machine-readable storage medium having stored thereon machine executable instructions which, when called and executed by a processor, cause the processor to carry out the method for controlling image capturing including:

measuring the speed of an object;

determining the line frequency for image capturing according to the speed of the object; and controlling a line scan camera to perform image capturing on the object with the line frequency.

In the embodiment of the present application, the speed of the object is measured, the line frequency of the image capturing is determined according to the speed of the object, and capturing an image of the object with the determined line frequency. The line frequency of the line scan camera can thus match the speed of the object, which can effectively eliminate deformation of images of the object captured by a line scan camera, which would otherwise occur due to stretch or compression, and thereby improve the utility of these images.

Fifth Embodiment

Based on the same inventive concept, an embodiment of the present application further provides a computer program which, when executed by a processor, cause the processor to carry out the method for controlling image capturing including:

measuring the speed of an object;

determining the line frequency for image capturing according to the speed of the object; and controlling a line scan camera to perform image capturing on the object with the line frequency.

In the embodiment of the present application, the speed of the object is measured, the line frequency of the image capturing is determined according to the speed of the object, and capturing an image of the object with the determined line frequency. The line frequency of the line scan camera can thus match the speed of the object, which can effectively eliminate deformation of images of the object captured by a line scan camera, which would otherwise occur due to stretch or compression, and thereby improve the utility of these images.

It should be noted that, relationship terms such as "first", "second", and the like in the specification are solely for distinguishing one entity or operation from another, but do not necessarily require or imply that there is any actual relationship or order between these entities or operations. Moreover, terms such as "include", "comprise" or any other variants thereof are intended to be non-exclusive, so that processes, methods, articles or devices comprising a series of elements may comprise not only those elements listed but also those not explicitly listed or the elements intrinsic to these processes, methods, articles, or devices. Without further limitations, elements defined by the wording "comprise(s) a" or "include(s) a" do not exclude that there are other identical elements in the processes, methods, articles, or devices which include these elements.

All of the examples in the description are described in a correlated manner, and description of a component in an example may apply to another containing the same. The description for each example focuses on the differences from other examples.

In particular, a brief description is provided to embodiments of the methods, devices, electronic devices, machine-readable storage media and computer program for controlling image capturing in view of their resemblance with the embodiments of the system for acquiring an image of a chassis of a vehicle. Relevant details can be known with reference to the description of the embodiments of the system for acquiring an image of a chassis of a vehicle.

For convenience of description, the above system is described as being divided into various units/modules. Of course, the functions of each unit/module may be implemented in same software and/or hardware in practicing the present application.

One of ordinary skills in the art will appreciate that all or part of the processes of the foregoing embodiments can be implemented by computer program instructing related hardware. The program can be stored in a computer readable storage medium, which when executed, the flow of embodiments of the method as described above will be carried out. The storage medium may be a magnetic disk, an optical disk, a read-only memory (ROM), or a random access memory (RAM).

The embodiments described herein are only specific embodiments of the present application, and are not intended to limit the protection scope of the present application. Any modification or equivalent that can be easily conceived by those skilled in the art should all fall within the protection scope of the present application. Therefore, the protection scope of this application is defined by the accompanying claims.

The invention claimed is:

1. A method for controlling image capturing, comprising:

measuring a speed of an object by a speed measuring module comprising an image capturing module, the measuring comprising:

capturing, by the image capturing module, images of the object in motion continuously, and calculating the number of pixels $V_P$ that the object travels across per unit time on an imaging plane of the image capturing module by using the continuously captured images, the calculating comprising:

determining relative positions of a feature point of the object both in the i-th image and in the (i+1)-th image captured by the image capturing module, wherein i is an integer and $1 \leq i < m$, and m is the total number of the images captured by the image capturing module;

determining the number of pixels n between the determined two relative positions; and calculating the number of pixels $V_p$ that the object travels across per unit time on the imaging plane of the image capturing module according to the following formula:

$$V_P = n/t;$$

wherein t is a time interval between the capturing of the i-th image and the capturing of the (i+1)-th image by the image capturing module;

determining line frequency for image capturing according to the speed of the object by determining the line frequency for image capturing according to the calculated number of pixels $V_P$; and controlling a line scan camera to perform image capturing on the object with the line frequency;

wherein a linking line linking the image capturing module and the line scan camera is parallel to a direction of motion of the object;

wherein before measuring the speed of the object, the method further comprises:

detecting incoming of the object; and in response to that the incoming of the object is detected, generating an incoming signal to trigger the measurement of the speed of the object, and wherein the method further comprises:

detecting leaving of the object; and in response to that the leaving of the object is detected, generating an outgoing signal to control the line scan camera to stop the image capturing on the object.

2. The method for controlling image capturing according to claim 1, wherein the step of determining the line frequency for image capturing according to the calculated number of pixels $V_P$ comprises:

determining the line frequency for image capturing Q according to the following formula:

$$Q=V_p*(p_2/f_2)*(f_1/p_1);$$

wherein, $V_p$ is the number of pixels that the object travels across per unit time on the imaging plane of the image capturing module; $p_2$ is a size of a single pixel of the image capturing module; $f_2$ is a focal length of the image capturing module; $p_1$ is a size of a single pixel of the line scan camera; and $f_1$ is a focal length of the line scan camera, and wherein the direction of motion of the object is a direction from the image capturing module towards the line scan camera.

3. The method for controlling image capturing according to claim 1, wherein the step of determining the line frequency for image capturing according to the speed of the object comprises:

determining the line frequency for image capturing according to the speed of the object, the number of pixels per one row of the line scan camera and a preset scale factor.

4. The method for controlling image capturing according to claim 3, wherein the step of determining the line frequency for image capturing according to the speed of the object, the number of pixels per one row of the line scan camera and the preset scale factor comprises:

calculating the line frequency for image capturing Q according to the following formula:

$$Q=k*w*v;$$

wherein v is the speed of the object; w is the number of pixels per one row of the line scan camera; and k is the preset scale factor.

5. The method for controlling image capturing according to claim 1, wherein the measuring of the speed of the object comprises: detecting a change in the speed of the object; and in response to that a change in the speed of the object is detected, determining the changed speed;

wherein the determining of the line frequency for image capturing according to the speed of the object comprises: determining new line frequency for image capturing according to the changed speed;

and wherein the controlling of the line scan camera to perform image capturing on the object with the line frequency comprises: continuing the image capturing on the object with the newly determined line frequency.

6. The method for controlling image capturing according to claim 1, further comprising:

providing fill-in light for the object while the line scan camera is controlled to perform image capturing on the object.

7. An electronic device, comprising a processor and a machine-readable storage medium, wherein the machine-readable storage medium has stored thereon machine executable instructions which, when executed by the processor, cause the processor to carry out the method of claim 1.

8. A non-transitory machine-readable storage medium having stored thereon machine executable instructions which, when called and executed by a processor, cause the processor to carry out the method of claim 1.

9. A system for acquiring an image of a chassis of a vehicle, comprising a speed measuring module, a control module and a line scan camera; wherein the speed measuring module and the line scan camera are electrically connected to the control module, respectively;

the speed measuring module is configured to measure a speed of the vehicle and transmit the measured speed of the vehicle to the control module; and the control module is configured to determine line frequency for image capturing according to the speed of the vehicle, and control the line scan camera to perform image capturing on the chassis of the vehicle with the line frequency;

wherein the speed measuring module comprises an image capturing module, and a linking line linking the image capturing module and the line scan camera is parallel to a direction of motion of the vehicle;

wherein the speed measuring module measures the speed of the object by:

capturing, by the image capturing module, images of the object in motion continuously, and calculating the number of pixels $V_P$ that the object travels across per unit time on an imaging plane of the image capturing module by using the continuously captured images, the calculating further including:

determining relative positions of a feature point of the object both in the i-th image and in the (i+1)-th image captured by the image capturing module, wherein i is an integer and 1≤i<m, and m is the total number of the images captured by the image capturing module;

determining the number of pixels n between the determined two relative positions; and calculating the number of pixels $V_p$ that the object travels across per unit time on the imaging plane of the image capturing module according to the following formula:

$$V_P=n/t;$$

wherein t is a time interval between the capturing of the i-th image and the capturing of the (i+1)-th image by the image capturing module, wherein the line frequency for image capturing is determined according to the calculated number of pixels $V_P$, wherein before measuring the speed of the object, the method further comprises:

detecting incoming of the object; and in response to that the incoming of the object is detected, generating an incoming signal to trigger the measurement of the speed of the object, and wherein the method further comprises:

detecting leaving of the object; and in response to that the leaving of the object is detected, generating an outgoing signal to control the line scan camera to stop the image capturing on the object.

10. The system for acquiring an image of a chassis of a vehicle according to claim 9, wherein the control module is further configured to:

determine the line frequency for image capturing according to the speed of the vehicle, the number of pixels per one row of the line scan camera and a preset scale factor.

11. The system for acquiring an image of a chassis of a vehicle according to claim 10, wherein the control module is further configured to calculate the line frequency for image capturing Q according to the following formula:

$$Q=k*w*v;$$

wherein v is the speed of the vehicle; w is the number of pixels per one row of the line scan camera; and k is the preset scale factor.

12. The system for acquiring an image of a chassis of a vehicle according to claim 9, wherein the speed measuring module is further configured to detect a change in the speed of the vehicle; and in response to that a change in the speed of the vehicle is detected, determine the changed speed;

wherein the control module is further configured to determine new line frequency for image capturing according to the changed speed;

and wherein the line scan camera is further configured to continue the image capturing on the chassis of the vehicle with the newly determined line frequency.

13. The system for acquiring an image of a chassis of a vehicle according to claim 9, further comprising a light filling module configured to provide fill-in light for the chassis of the vehicle under the control of the control module, and/or wherein the light filling module is arranged on a side of the line scan camera and located on a line scan direction of the line scan camera.

14. The system for acquiring an image of a chassis of a vehicle according to claim 9, further comprising:

a first detecting module, arranged on a side of the speed measuring module near where the vehicle enters, which is configured to detect incoming of the vehicle, generate an incoming vehicle signal in response to that the incoming of the vehicle is detected, and transmit the incoming vehicle signal to the speed measuring module to trigger the speed measuring module to measure the speed of the vehicle.

15. The system for acquiring an image of a chassis of a vehicle according to claim 14, further comprising:

a second detecting module, arranged on a side of the line scan camera near where the vehicle leaves, which is configured to detect leaving of the vehicle, generate an outgoing signal in response to that the leaving of the vehicle is detected, and transmit the outgoing signal to the control module to trigger the control module to control the line scan camera to stop the image capturing on the chassis of the vehicle.

16. The system for acquiring an image of a chassis of a vehicle according to claim 9, further comprising:

a metal protection cylinder;

wherein the line scan camera is arranged in the metal protection cylinder; and wherein a transparent cover for a lens of the line scan camera is arranged on the metal protection cylinder, a damage-proof protection member is arranged over the transparent cover, and a light incident hole is formed on the damage-proof protection member.

17. The system for acquiring an image of a chassis of a vehicle according to claim 16, wherein the metal protection cylinder comprises an outer cylinder and an inner cylinder sleeved in the outer cylinder, wherein the line scan camera is arranged inside the inner cylinder;

the transparent cover is supported over the inner cylinder, and the damage-proof protection member is supported over the outer cylinder.

* * * * *